(12) United States Patent
Pich et al.

(10) Patent No.: US 7,762,340 B2
(45) Date of Patent: Jul. 27, 2010

(54) INSTALLATION FOR ENHANCED OIL RECOVERY USING WATER SOLUBLE POLYMERS, METHOD FOR IMPLEMENTING SAME

(75) Inventors: Rene Pich, Saint Etienne (FR); Philippe Jeronimo, Montrond les Bains (FR)

(73) Assignee: S.P.C.M. S.A., St. Etienne (FR)

( * ) Notice: Subject to any disclaimer, the term of this patent is extended or adjusted under 35 U.S.C. 154(b) by 39 days.

(21) Appl. No.: 12/249,364

(22) Filed: Oct. 10, 2008

(65) Prior Publication Data
US 2009/0095481 A1   Apr. 16, 2009

Related U.S. Application Data

(60) Provisional application No. 60/982,246, filed on Oct. 24, 2007.

(30) Foreign Application Priority Data
Oct. 12, 2007  (FR)  ................. 07 58248

(51) Int. Cl.
  *E21B 43/16*  (2006.01)
(52) U.S. Cl. ............... 166/369; 166/68.5; 166/75.12; 166/75.15; 166/90.1; 175/209; 175/217
(58) Field of Classification Search ......... None
  See application file for complete search history.

(56) References Cited

U.S. PATENT DOCUMENTS 6,045,070 A * 4/2000 Davenport .................. 241/60
2001/0031705 A1* 10/2001 Adams et al. ............... 507/117

FOREIGN PATENT DOCUMENTS

| FR | 1295921 A | 6/1962 |
| FR | 1422802 A | 1/1966 |
| FR | 2596407 A | 10/1987 |

OTHER PUBLICATIONS

The French Search Report for FR 0758248, dated May 27, 2008.

* cited by examiner

*Primary Examiner*—Zakiya W. Bates
(74) *Attorney, Agent, or Firm*—Heslin Rothenberg Farley & Mesiti P.C.

(57) ABSTRACT

Installation for enhanced oil recovery comprising in succession: a polymer storage hopper, a grinding device, a dissolution/maturation tank for the dispersed polymer, and a pump for transferring pressurized polymer solution in the pipeline conveying the injection water for introducing the mixture of polymer and injection water into a well. The grinding device has a chamber for grinding and draining the dispersed polymer comprising a rotor and a stator, and on all or part of the periphery of the chamber, a ring fed by a secondary water circuit. The ring communicates with the chamber for spraying of pressurized water on the blades of the stator. A method implementing the installation is also provided.

17 Claims, 2 Drawing Sheets

Figure 1:
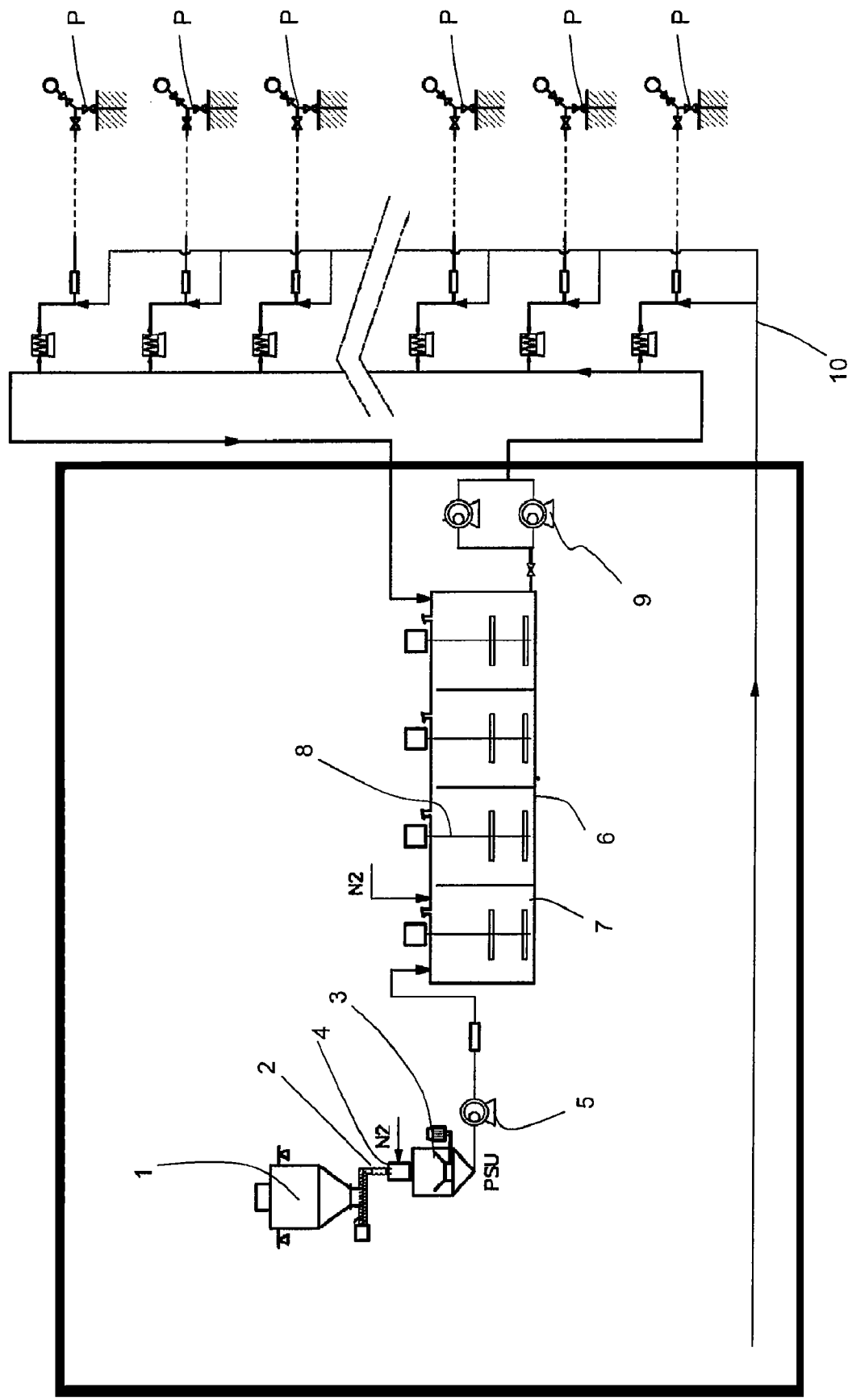

INSTALLATION FOR ENHANCED OIL RECOVERY USING WATER SOLUBLE POLYMERS, METHOD FOR IMPLEMENTING SAME

CROSS REFERENCE TO RELATED APPLICATIONS

This application claims priority of French application No. 0758248 filed Oct. 12, 2007, and U.S. provisional application No. 60/982,246 filed Oct. 24, 2007, the full disclosures of which are hereby incorporated by reference herein.

BACKGROUND ART

The invention relates to an installation for enhanced oil recovery using water-soluble polymers. It also relates to a method of enhanced oil recovery implementing the said installation.

(Co)polymers of acrylamide and/or methacrylamide account for a large share of the water-soluble polymers used in the oil industry for numerous applications. Such polymers are highly advantageous in particular for improving enhanced oil recovery by injection in solution. This method consists in flooding/sweeping the oil field using a water injection more or less saline, also called "brine", in which the polymer is dissolved to viscosity it, thereby forcing the oil to leave the pores of the rock. In this application, the quantities of polymers used may be very large, more than 50 000 tonnes/year, which is most unusual.

More precisely, the effectiveness of this technique is heavily dependent on the difference in viscosity existing between the oil and the brine. To reduce it, it is necessary to thicken the injection water using an addition of water-soluble polymers, very often a very high molecular weight polymer or copolymer of acrylamide and/or methacrylamide. This is one of the methods of Enhanced Oil Recovery (EOR).

However, these polymers are relatively sensitive to degradation. Among these forms of degradation, three types are distinguished: hydrolysis reactions, mechanical degradation and free radical degradation reactions. The first causes changes in the chemical composition of the polymer, while the other two cause a decrease in the chain length.

It is therefore very important to prevent the polymer chain from being degraded in order to preserve all the viscosifying properties of the polymer during its use.

In the present invention, "degradation" means any process causing a break in the chains of the macromolecule. This type of degradation implies the formation of free radicals which attack the macromolecular chains followed by propagation reactions. These free radicals, which are degradation initiators, may be formed in particular by redox reactions between the oxidizing parts (particularly oxygen) and the reducing parts (oxygen inhibitor, hydrogen sulphide, $Fe^{2+}$).

In practice, acrylamide (co)polymers are usually commercially available in the form of powders or emulsions. They are generally used in dilute aqueous solution for industrial applications. Due to their high molecular weight, the viscosity of the resulting solution is high. This has the consequence of limiting the concentration of the polymer in the solution if it is desired to partly eliminate the formation of aggregates in the dispersing device. This concentration commonly does not exceed 5 g/l for polymers having molecular weights of about 15 million. Above this, the formation of "fisheyes" is observed, corresponding to the actual aggregation of polymer powder. It is then necessary to apply coarse filtration (100-200 microns), and finer filtration (10-20 microns) to remove the "fisheyes" in two successive steps. Furthermore, the residence time in the dispersion device being relatively short, the polymer does not have the time to dissolve and is therefore not pumpable and usable as such, necessitating a subsequent maturation or dissolution step.

After dissolution, the polymer is diluted by the brine used on the field in order to obtain the required concentration (typically 500 to 3000 ppm) and viscosity (typically 5 to 50 centipoises).

In practice, the dispersion is carried out using one of the following means:
- a water eductor fed by a cone, itself wetted to prevent sticking,
- an air transport of the powder followed by wetting by water nozzles above the dissolution tank,
- any other method in which the powder is contacted with water under agitation.

With regard to the dissolution, this takes place in the open air in dissolution tanks with an oxygen saturation of 4 to 7 ppm which chemically degrades the injection polymer even in the presence of an oxygen reducer (ammonium bisulphite) by the formation of free radicals. Obviously, the aim is to be able to inject a solution having the precise concentration leading to the required viscosity. For example, at injection concentrations of 1000 to 2000 ppm and hourly flow rates of 500 $m^3$ to 2000 $m^3$, it is necessary to dissolve 500 to 4000 kg/hour of polymer, which is much larger than the quantities conventionally used, for example in flocculation, during sludge treatment operations.

The problem that the invention therefore proposes to solve is to develop an installation for dispersing large quantities of highly concentrated polymer in order to decrease the size of the maturation/dissolution tanks, and this:
- without input of external oxygen in order to preserve the molecular weight of the polymer;
- and without filtration of the resulting solution because this is a difficult and costly operation.

BRIEF SUMMARY OF THE INVENTION

For this purpose, the Applicant has developed an installation for enhanced oil recovery comprising in succession:
- a storage hopper for water-soluble polymer having a standard grain size distribution,
- a grinding device for dispersing the polymer,
- a dissolution/maturation tank for the dispersed polymer having several stirred compartments, or batch tanks,
- a pump for transferring the polymer solution under pressure in the pipeline conveying the injection water for introducing the mixture (polymer+injection water) into the well.

The installation is characterized in that the grinding device comprises:
- a wetting cone in which the polymer is metered, usually using a metering screw, the said cone being connected to a primary water inlet circuit
- at the bottom end of the cone:
  - a chamber for grinding and draining the dispersed polymer comprising:
    - a rotor driven by a motor and equipped with knives optionally tilted with respect to the radius of the rotor,
    - a fixed stator consisting of blades optionally tilted with respect to the radius of the rotor and uniformly spaced
    - the rotor/stator assembly permitting a wet grinding of the polymer, on all or part of the periphery of the chamber, a ring fed by a secondary water circuit, the ring communicating with the chamber for the spraying of pressurised water on the blades of the stator and thereby releasing the ground and swollen polymer on the surface of the said blades, the assembly serving to decrease the speed of rotation and increase the concentration of the dispersion leaving the grinding chamber.

In the rest of the description and in the claims, "polymer having standard grain size distribution" means powders having a grain size distribution between 0.15 and 1 mm. Practically, the molecular weight of the polymer is of at least 10 millions, advantageously more that 15 millions.

In other words, the invention consists in having developed an installation wherein the grinding device has been modified to permit an increase in the polymer concentration in the dispersion without necessarily clogging the said grinding device (thanks to the injection of pressurized secondary water while maintaining a low speed of rotation). Because of this high concentration (0.5 to 3%) and the polymer flow in powder form (in practice, about 300 kg/h for a cutting diameter of 200 mm), the polymer is not completely dissolved in the grinding device. To solve this problem, the installation further contains a dissolution/maturation tank making it possible, at equal concentration (0.5 to 3%) to complete the dissolution of the polymer to make it pumpable.

According to a first feature of the grinding device, the polymer is wet in the cone by overflow, the cone being equipped in this case with a double jacket at the base of which the primary water inlet circuit is connected. Alternately, this wetting can also take place in a cone by any other means well known to a person skilled in the art, for example spray nozzles or a flat jet.

In practice, the rotor is equipped with 2 to 20 knives, advantageously between 4 and 12. However, depending on the rotor diameter, the number of knives may vary. Similarly, the number of blades of the stator is variable according to the diameter thereof. In practice, it is between 50 and 300, advantageously between 90 and 200 for a rotor diameter of 200 mm. Moreover, and according to another feature, the knives are optionally more or less tilted with respect to the radius of the rotor. Advantageously, this tilt is between 0 and 15°, preferably between 2 and 10°.

According to another feature, the distance between the blades of the stator is between 50 and 800 microns. For effective grinding, the distance between the knives of the rotor and the blades of the stator is between 50 and 300 microns, advantageously between 100 and 200 microns, in practice about 100 microns. Advantageously, the blades of the stator are tilted at an angle smaller than 10° with respect to the radius of the rotor. These blades are either assembled in a casing, or cut in the mass of a metal or of a high strength compound.

In one advantageous embodiment, the rotor knives are not tilted, while the stator blades are tilted.

Furthermore, concerning the peripheral ring, it communicates with the grinding and draining chamber via perforations in the form of holes, slits or equivalent, whereof the size and distribution on the ring are such that the secondary water can be propelled on the blades of the stator at a pressure serving to prevent the clogging by the gelled polymer, of the spaces between the blades. Accordingly, the pressure applied by the rotor pump effect can be sharply decreased without a risk of plugging. The smaller the spacing of the blades, the higher the pressure required for continuous operation.

Obviously, the storage hopper permits the continuous feed and receives the polymer either in bulk (trucks) or in bags of various capacities.

As already stated, the installation further comprises one or more maturation/dissolution tanks, or, alternatively, batch tanks. The compartmentalized tank or the batch tanks serve to dissolve the portion of polymer not yet dissolved in the grinding device. The dissolution/maturation tank contains, for example, several compartments, each equipped with a mechanical stirrer. This tank is in practice 2 to 8 times smaller than the tanks used today, due to the fact that the polymer concentration obtained in the grinding device, and hence in the dissolution/maturation tank, is higher, the same for the dissolution rate.

Advantageously, the dissolution/maturation tank is a tank comprising several compartments, each being equipped with a mechanical stirrer. In this case, the polymer is dissolved, without the addition, of water by "maturation".

Furthermore and in practice, the pumps for transferring the polymer solution to the pipeline conveying the injection water or brine are high pressure pumps of the Triplex, screw or other types.

In one particular embodiment, when the dissolution/maturation tank is distant from the grinding device, a positive displacement pump (Moyno type) is inserted with a speed variator for maintaining a predefined pressure (1 to 3 bar) at the inlet of the high pressure injection pumps. This pressure allows to supply the high pressure pumps without cavitation.

A further subject of the invention is a method for enhanced oil recovery implementing the installation described above.

According to this method, in continuous or batch mode and under inert atmosphere, advantageously nitrogen:

the grinding device is fed with polymer having a standard grain size distribution, in the grinding device:
   the polymer is prewetted in the wetting cone by a quantity of primary water suitable for obtaining a polymer suspension having a concentration of 15 to 100 g/l, advantageously 20 to 80 g/l,
   then, instantaneously, in the grinding and draining chamber, the size of the prewetted polymer is reduced, in practice to a size of 50 to 200 microns by chopping the polymer between the knives of the rotor and the blades of the stator without degradation of the molecular weight of the polymer,
   then, the pressurised secondary water from the peripheral ring is used to clear the interstices between the blades of the stator in which the swollen polymer is liable to be fixed, the dispersed polymer is then transferred, whereof the concentration obtained by dilution with the secondary water is then between 3 and 30 g/liter, advantageously between 10 and 25 g/l in the dissolution/maturation tank or in the batch tanks where the polymer is put in the same concentration with gentle stirring, advantageously during a short period (generally less than 30 minutes), once the polymer is dissolved, the said polymer is transferred to the pipeline in which the injection water flows for injection of the mixture (polymer+injection water) into the well, while advantageously limiting the dissolution of oxygen to less than 500 ppb, and if possible, less than 100 ppb in the polymer solution.

Advantageously, the primary water represents between 20 to 40% by weight of the total water (primary water+secondary water) whereas secondary water represents between 60 to 80% of the total water (primary water+secondary water) which is required for obtaining a polymer concentration of between 5 and 30 g/liter.

In practice, according to one feature of the method, the speed of rotation of the rotor is between 2000 and 5000 rpm, on average about 3000 rpm for a cutting diameter of 200 mm. It is between 3000 and 6000 rpm for a cutting diameter of 100 mm and between 1500 and 3000 rpm for a cutting diameter of 400 mm. More generally, according to the diameter of the rotor also referred to as cutting diameter, the rotor speed is between 20 and 40 m/s instead of 90 to 120 m/s for a Comitrol® 1500 apparatus.

Furthermore, to avoid plugging the space between the stator blades by the ground polymer, the secondary water is propelled through the perforations of the ring at a pressure of at least 1 bar, usually at the main water pressure, or 3 to 6 bar or more, for very fine intervals, in general between 1 and 10 bar.

In practice, the injection water is a brine coming from the oil production water, seawater or aquifer water. Similarly, the polymer is a (co)polymer of acrylamide and/or methacrylamide.

The method of the invention allows, under inert atmosphere, to dissolve a very high molecular weight (co)polymer of acrylamide in less than 30 minutes and at ambient temperature, this dissolution time being reducible to less than 10 minutes with production water at 50° C.

The invention and its advantages will appear clearly from the examples described below, in conjunction with the figures appended hereto.

BRIEF DESCRIPTION OF THE DRAWING FIGURES

Figure 2:
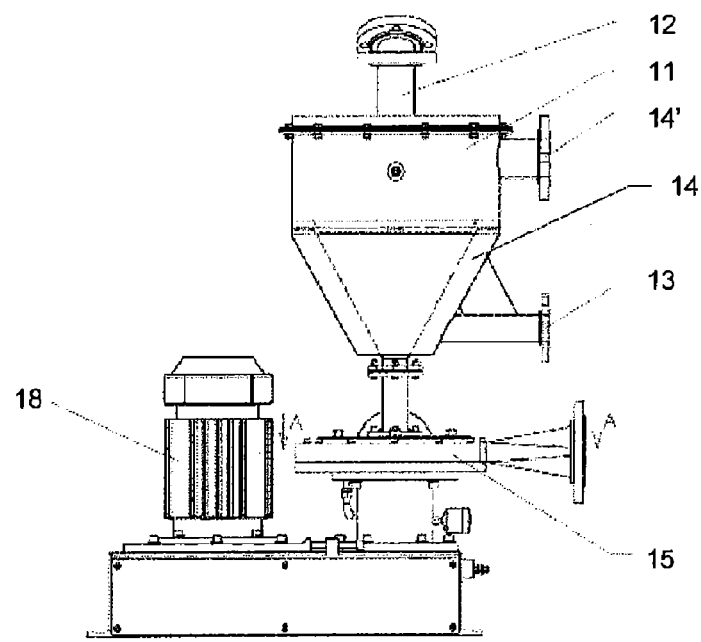
Figure 3:
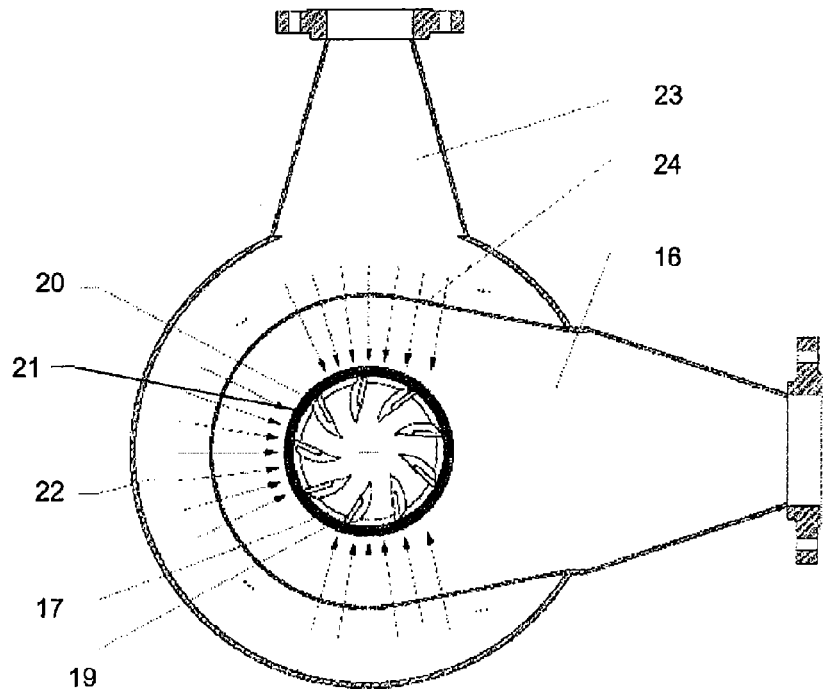

FIG. 1 is a schematic representation of an installation of the invention.
FIG. 2 is a schematic side view of the grinding device.
FIG. 3 is a cross section along AA' of FIG. 2.

DETAILED DESCRIPTION

EXAMPLE 1

Installation

FIG. 1 shows the installation implementing the method of the invention. The installation comprises a storage silo (1) for the polymer in powder form, which has, at its base, a metering screw (2) for transferring the polymer to the grinding device (3) under nitrogen (4).

The grinding device is shown more particularly in FIGS. 2 and 3.

The grinding device comprises:
a wetting cone (11) connected at its apex to a column (12) dosing the standard grain size distribution polymer, usually via a metering screw, the cone (11) being connected at its bottom to a primary water inlet circuit (13) which feeds an overflow (14, 14'),
at the bottom end of the cone, an assembly (15) comprising:
a chamber (16) for grinding and draining the dispersed polymer (FIG. 2) comprising:
a rotor (17) driven by a motor (18) fitted with knives (19),
a fixed stator (20) comprising blades (21) uniformly spaced and slightly tilted with respect to the radius of the rotor,
on all or part of the periphery of the chamber, a ring (22) fed by a secondary water circuit (23), the ring (22) communicating with the chamber (16) via slits (24) for spraying pressurised water on the blades (21) of the stator (20).

In the grinding device:
the polymer is prewetted in the wetting cone by a quantity of primary water (20 to 40% by weight of the total water) suitable for obtaining a polymer suspension having a concentration of 20 to 80 g/l,
then, instantaneously, in the grinding and draining chamber, the size of the prewetted polymer is reduced to a size of 50 to 200 microns by chopping the polymer between the knives of the rotor and the blades of the stator,
then, the pressurised secondary water (60 to 80% by weight of the total water) from the peripheral ring is used to clear the interstices between the blades of the stator in which the swollen polymer is liable to be fixed.

The dispersed polymer is then transferred, optionally using a positive displacement pump (5), to the dissolution/maturation tank (6), which is equipped with several compartments (7), each equipped with a mechanical mixer (8) or in batch dissolution tanks not shown. The continuous system has the advantage of being smaller for the same solution flow rate.

The polymer is then pumped using a positive displacement pump (9) for mixing with the brine (salt seawater) (10) before being injected into the well (P).

EXAMPLE 2

Application

DEFINITIONS

For each of the examples, the following definitions apply:
Viscosity Yield→Brookfield viscosity of the polymer diluted to 1 g/liter in the dissolution brine; Brookfield type LVT with a mobile unit having a UL type geometry at a speed of 6 rpm;
Filter ratio→indication of the quantity of insoluble or undissolved polymer.

This measurement expresses a variation in flow rate on polycarbonate filter with 5 microns porosity. The filter ratio test consists in filtering under pressure (2 bar) 300 ml of a polymeric solution in a concentration of 1 g/l. The filter ratio corresponds to the ratio (time of passage between 300 and 200 ml) to (time of passage between 200 and 100 ml);
Polymer→this is an acrylamide-sodium acrylate copolymer (molar ratio 70/30) having a molecular weight of 20 million and a grain size distribution of 0-1000 microns;
Dissolution water→this is a brine having a salinity (or TDS "Total Dissolved Solid") of 5000 ppm according to the following properties:

| | |
|---|---|
| NaCl | 4.7 g/l |
| $CaCl_2 \, 2H_2O$ | 0.29 g/l |
| $MgCl_2 \, 2H_2O$ | 0.24 g/l |
| Temperature | 25° C. |
| pH | 7.8 |

EXAMPLE 1

In this laboratory test, the polymer was dissolved in the dissolution water in a concentration of 5 g/liter. Samples were taken every 10 minutes to be then diluted to 1 g/liter for a viscosity yield measurement.

Result: It may be observed that after 50 minutes, the viscosity yield reaches a peak viscosity of 27.3 cps with a filter ratio of 1.3. These values are then virtually invariable.

EXAMPLE 2

A grinder according to the invention is used, with technical characteristics and dissolution conditions listed in the table below.

|  | Test 1 "PSU 300" |
| --- | --- |
| Technical features of the grinding unit | |
| Cutting diameter in mm (rotor size) | 200 |
| Number of fixed knives | 90 |
| Height of fixed knives in mm | 16.6 |
| Spacing between knives | 300 microns |
| Spacing between fixed/mobile knives | 100 microns |
| Cutting angle | 3° |
| Number of mobile knives (i.e.: on the rotor) | 6 |
| Rotor speed | 3000 rpm |
| Rotor power | 7.5 Kw |
| Dispersion characteristics | |
| Primary water flow rate | 10 m$^3$/h |
| Temperature | 40° C. |
| Anionic polyacrylamide flow rate (anionicity 30%; molecular weight 19 million; grain size distribution 0-1000 microns) | 300 kg/h |
| Secondary water flow rate in the concentric ring surrounding the stator (pressure 2 bar) | 20 m$^3$/h 25° c. |
| Final concentration of dispersion | 10 g/l |
| Final pressure | 1.5 bar |

The final dispersion, in a concentration of 10 g/liter, is then pumped to a 7.5 m$^3$ capacity dissolution tank comprising four stirred compartments in series with a total residence time of 15 minutes. This solution, after being tapped off, is immediately diluted in the same brine to 1 g/liter. It has a viscosity yield of 27.5 cps and a filter ratio of 1.2.

Conclusion: The installation of the invention allows to obtain polymer solutions having better filter ratio in a much shorter time.

EXAMPLE 3

In a standard dissolution apparatus, the powder is dispersed in a water ejector in a concentration of 5 g/liter. In a glove box under nitrogen, the solution obtained is then diluted to a concentration of 0.1% (1 g/l) with the brine containing 20 ppb oxygen. The quantity of residual oxygen in the solution is then measured using an Orbisphere™ apparatus. The figure is 1100 ppb. The solution has a viscosity yield of 27 cps. After one month of aging at 50° C., the viscosity has dropped from 27 to 20 cps.

EXAMPLE 4

According to the installations described in example 2, the polymer is dissolved to 10 g/liter in the production water containing 20 ppb oxygen under a nitrogen blanket containing 100 ppm oxygen. This solution is then diluted with the same water to 0.1%.

The dissolved oxygen measured in this solution is 32 ppb. A stability test at 50° C. for one month (according to example 3) is then performed. The viscosity of the solution remains stable at 27 cps.

Conclusion: The installation of the invention allows to obtain polymer solutions having a stable viscosity over time.

The invention claimed is:

1. Installation for enhanced oil recovery comprising in succession:
    a storage hopper for water-soluble polymer having a standard grain size distribution,
    a grinding device for dispersing the polymer,
    a dissolution/maturation tank for the dispersed polymer having several stirred compartments, or batch tanks, and providing a polymer solution,
    a pump for transferring the polymer solution under pressure in a pipeline conveying injection water for introducing a mixture of polymer and injection water into a well,
    wherein the grinding device comprises:
    a wetting cone in which the polymer is metered, said cone being connected to a primary water inlet circuit such that the polymer is prewetted in the wetting cone by a quantity of primary water suitable for obtaining a polymer suspension having a concentration of 15 to 100 g/l,
    at a bottom end of the cone:
        a chamber for grinding and draining the dispersed polymer comprising:
        a rotor driven by a motor and equipped with knives,
        a fixed stator having blades,
            on all or part of a periphery of the chamber, a ring fed by a secondary water circuit, the ring communicating with the chamber for spraying of pressurised secondary water on the blades of the stator and thereby releasing ground and swollen polymer on a surface of said blades and diluting the dispersed polymer to a concentration between 3 and 20 g/l.

2. Installation according to claim 1, wherein the knives are tilted with respect to a radius of the rotor.

3. Installation according to claim 2, wherein the knives are tilted by an angle of between 0 and 15° with respect to the radius of the rotor.

4. Installation according to claim 2, wherein the knives are tilted by an angle of between 2 and 10° with respect to the radius of the rotor.

5. Installation according to claim 1, wherein said blades are tilted with respect to a radius of the rotor and uniformly spaced.

6. Installation according to claim 1, wherein a first distance between the blades of the stator is between 50 and 800 microns, while a second distance between the knives of the rotor and the blades of the stator is between 50 and 300 microns.

7. Installation according to claim 6, wherein said second distance is between 100 and 200 microns.

8. Installation according to claim 1, wherein the dissolution/maturation tank contains several compartments, each equipped with a mechanical stirrer.

9. Method for enhanced oil recovery implementing the installation according to claim 1.

10. Method according to claim 9, wherein, in continuous mode and under inert atmosphere:
    the grinding device is fed with polymer having a standard grain size distribution,
    in the grinding device:

the polymer is prewetted in the wetting cone by a quantity of primary water suitable for obtaining a polymer suspension having a concentration of 15 to 100 g/l, then, instantaneously, in the grinding and draining chamber, the size of the prewetted polymer is reduced, by chopping the polymer between the knives of the rotor and the blades of the stator, then, the pressurised secondary water from the peripheral ring is used to clear interstices between the blades of the stator in which the swollen polymer is liable to be fixed, the dispersed polymer is then transferred, whereof the concentration obtained by dilution with the secondary water is then between 3 and 30 g/liter in the dissolution/maturation tank or in the batch tanks where the polymer is put in the same concentration with gentle stirring, once the polymer is dissolved, said polymer is transferred to the pipeline in which the injection water flows for introducing the mixture of polymer and injection water into the well.

11. Method according to claim 10, wherein the polymer suspension obtained by prewetting in the wetting cone has a concentration of 20 to 80 g/l.

12. Method according to claim 10, wherein the concentration obtained by dilution with the secondary water is between 10 and 25 g/l.

13. Method according to claim 10, wherein the primary water represents between 20 to 40% by weight of total water, total water comprises the primary water and the secondary water, and the secondary water represents between 60 to 80% of the total water.

14. Method according to claim 10, wherein the peripheral speed of rotation of the rotor is between 20 and 40 m/s.

15. Method according to claim 10, wherein the secondary water is propelled under a pressure of between 1 and 10 bar.

16. Method according to claim 15, wherein the secondary water is propelled under a pressure of between 3 and 6 bar.

17. Method according to claim 9, wherein the polymer comprises a (co)polymer of acrylamide and/or methacrylamide.

* * * * *